(No Model.) 2 Sheets—Sheet 1.

E. G. FERGUSON.
VEHICLE WHEEL.

No. 277,252. Patented May 8, 1883.

WITNESSES:
W. W. Hollingsworth
Edw. H. Byrn

INVENTOR:
E. G. Ferguson
BY Mann & Co.
ATTORNEYS.

(No Model.) 2 Sheets—Sheet 2.

E. G. FERGUSON.
VEHICLE WHEEL.

No. 277,252. Patented May 8, 1883.

WITNESSES:
W. W. Hollingsworth
Edw. W. Byrn

INVENTOR:
E. G. Ferguson
BY Munn & Co.
ATTORNEYS.

UNITED STATES PATENT OFFICE.

EDWARD G. FERGUSON, OF MACON, GEORGIA.

VEHICLE-WHEEL.

SPECIFICATION forming part of Letters Patent No. 277,252, dated May 8, 1883.

Application filed January 27, 1883. (No model.)

*To all whom it may concern:*

Be it known that I, EDWARD GEORGE FERGUSON, of Macon, in the county of Bibb and State of Georgia, have invented a new and useful Improvement in Vehicle-Wheels; and I do hereby declare that the following is a full, clear, and exact description of the same, reference being had to the accompanying drawings, forming part of this specification, in which—

Figure 1:
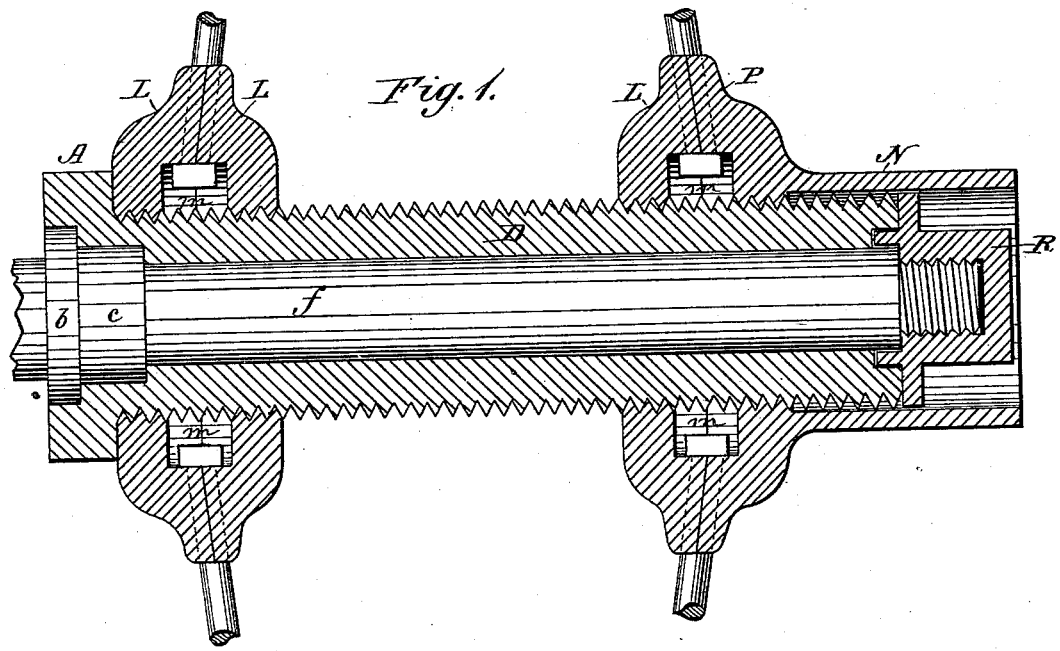
Figure 2:
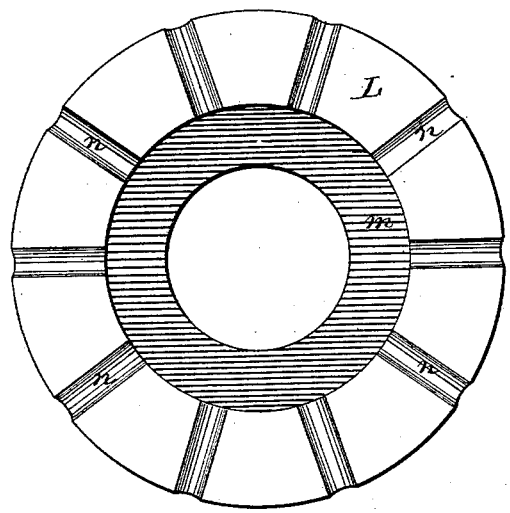
Figure 3:
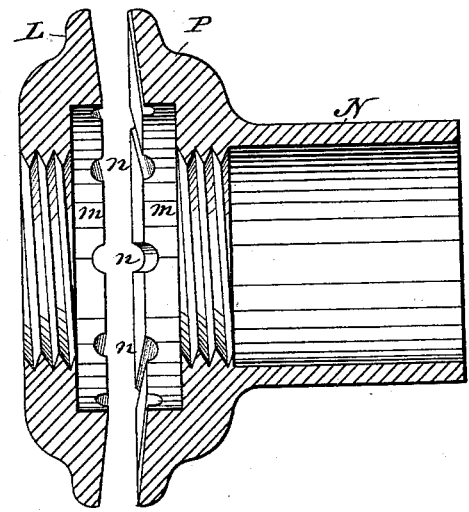
Figure 4:
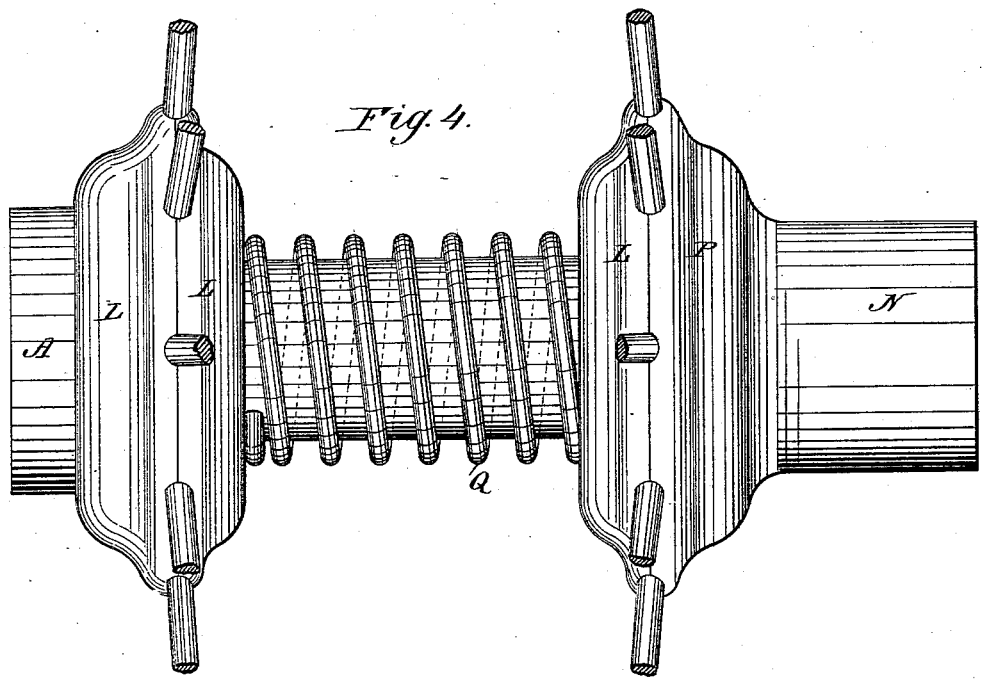
Figure 5:
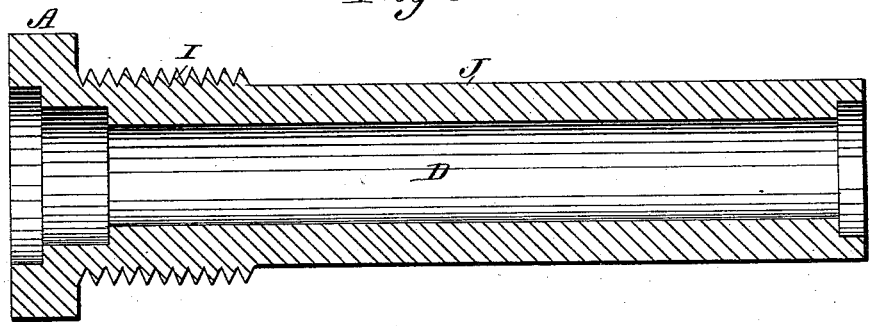

Figure 1 is a central section of the hub of the wheel. Fig. 2 is a face view of one of the disks which clamp the spokes. Fig. 3 is a sectional view of the two outer clamping-disks juxtaposed. Fig. 4 is a side view of a modified form of hub, and Fig. 5 is a longitudinal section of the box employed in Fig. 4.

My invention relates to an improved vehicle-wheel, which I call a "steel suspension-wheel," the same being designed to provide a light strong wheel applicable to buggies, wagons, bicycles, &c.

It consists in two sets of steel spokes, each clamped between radially notched or grooved disks, one or both of which pairs of disks are screw-threaded interiorly, and combined with a box or hub having screw-threads upon its outside periphery, by which the two pairs of disks and spokes are kept apart and under tension.

It also consists in the provision of a spiral spring interposed between the two pairs of disks and wound about the hub or box, so as to hold the two sets of spokes and their disks apart with a yielding strain to compensate for expansion and contraction due to variation in temperature, as will be hereinafter fully described.

In the drawings, Fig. 1, *b c f* represent the journal of the axle, upon which is fitted the tubular box A D, the same being held upon the axle by the screw nut or cap R, which is screwed directly over the end of the axle-bearing and overlaps upon the end of the box A D. The inner end of this box is made with a flange, as shown at A, and its body portion D is screw-threaded exteriorly to its end.

S S' are two series of steel-rod spokes, whose outer ends are riveted or otherwise fastened to a steel tire or felly, which is made of half or three-quarters round steel, having the flat side out and the convex face inside. These two sets of spokes are held at the center between disks L L and L P. Each of these disks is formed with radial notches or grooves *n* in its face, and with a circular recess, *m*, so that when the two disks of either pair are placed together their notches *n* correspond and form seats for the spokes, while their recesses *m* also correspond and form a chamber for the square heads on the inner ends of the spokes. All of the disks L L and L P are screw-threaded at their inner periphery to correspond with the external thread of the body D of the box, and after the spokes are put in place in the notches or grooves between the disks the disks are riveted together, and so retain the spokes. The outer one of the disks, P, is formed with a cuff or sleeve, N, which, extending over the threaded end of the box D, protects it, and also the nut R, from mud and dirt.

Now, in fitting the parts together, the two series of spokes are first connected to the felly, and their inner ends, with their heads, then inserted between the pairs of notched disks and the disks riveted or bolted together. The pair of disks L L is then forced away from the pair of disks L P until a sufficient tension is put upon the spokes, and then, while their tension exists, the box A D is screwed into the threaded hole through each pair of disks, which threads then hold the two pairs of disks apart and keep the whole wheel under a tension, which causes the weight or load on the wheel to be borne by all of the spokes—*i. e.*, those above the axle as well as those below it.

As a modification of my invention, I may make the external part of the box A D threaded only at the point I, as in Fig. 5, and cause the two pairs of disks L L and L P to be forced apart by the tension of a spiral spring, Q, Fig. 4, placed around the box between the two pairs of disks, the disks L L being connected to the box by the screw-thread I, so as to cause the wheel to revolve with its box A D, while the other disks, L P, are allowed to play on smooth surface J. This spiral spring Q serves to render the wheel more elastic and adapts it to expansion and contraction of the spokes due to variation in temperature. To protect this spiral spring from mud and dirt, a jacket or covering of rubber, fibrous or other suitable material should be placed over the same, and a hard-rubber ring may be also inserted between the disks in the recess m, beneath the heads of the spokes.

I am aware of the Patents No. 135,244, No. 143,820, and No. 263,982, and I do not claim anything shown therein.

Having thus described my invention, what I claim as new is—

1. The combination of the hollow box D, having enlarged portion A and provided with screw-threads on its periphery, the detachable spokes, two sets of disks, L L and L P N, clamped upon opposite sides of the two sets of spokes, the axle f, and the nut R, screwed upon the axle, inside the sleeve N, substantially as shown and described.

2. The combination of the hollow box D, having enlarged portion A, screw-threaded portion I, and plain portion J, of the detachable spokes, the two sets of disks L L and L P N, clamped upon opposite sides of the spokes, and the intermediate spiral spring, Q, placed between the two sets of disks and wound about the plain portion J, substantially as shown and described.

EDWARD GEORGE FERGUSON.

Witnesses:
W. B. DANIEL,
GOODE PRICE.